United States Patent [19]

Tsuda et al.

[11] 4,155,592
[45] May 22, 1979

[54] SEAT BACK WITH ADJUSTABLE LUMBAR SUPPORTER

[75] Inventors: Hiroshi Tsuda; Hideoki Matsuoka, both of Yokohama, Japan

[73] Assignee: Nissan Motor Co., Ltd., Yokohama, Japan

[21] Appl. No.: 920,246

[22] Filed: Jun. 29, 1978

[30] Foreign Application Priority Data

Aug. 7, 1977 [JP] Japan ............................ 52-105730[U]

[51] Int. Cl.² ............................................... A47C 7/46
[52] U.S. Cl. .................................................... 297/284
[58] Field of Search ...................... 297/284; 5/211, 212

[56] References Cited

U.S. PATENT DOCUMENTS

| 3,258,259 | 6/1966 | Bohlin | 297/284 |
| 3,273,877 | 9/1966 | Geller et al. | 297/284 |

FOREIGN PATENT DOCUMENTS 526572  9/1940  United Kingdom .................... 297/284

Primary Examiner—Francis K. Zugel

[57] ABSTRACT

A plurality of belts or wires are slackly strung between supporters mounted on the upright leg portions of a backrest frame to cross the front of the frame. Electrically driven tensioning means successively tensions each belt or wire to cause same to become taut.

7 Claims, 6 Drawing Figures

SEAT BACK WITH ADJUSTABLE LUMBAR SUPPORTER

FIELD OF THE INVENTION

The present invention relates in general to a vehicle seat and more particularly to a seat backrest the contour of which is adjustable to conform to the lumber contour of a particular occupant seated thereon.

BACKGROUND OF THE INVENTION

Throughout the specification, the terms "forward" and "rearward" are to be understood as referring to "in the direction to the front of the vehicle and subject seat" and "in the direction to the rear of the vehicle and subject seat", respectively and "upward" and "downward" to be taken as upward and downward with respect to the vehicle and subject seat, respectively.

It is desirable to equip a vehicle seat with a so-called "adjustable lumbar supporter" mounted in the backrest of the seat in order to increase riding comfort and minimize occupant fatigue. However previously proposed lumbar supporters are inevitably manually operated. In fact, the adjustment of the supporter is made by manually operating or handling a control knob which is usually fixed to an upper-side portion of the seat backrest. Thus, to an occupant sitting on the subject seat, it is troublesome to handle the control knob because the occupant must stretch his or her hand awkwardly, backwardly and upwardly to the upper-side portion of the backrest.

SUMMARY OF THE INVENTION

Therefore, an object of the present invention is to provide a seat which is equipped in the backrest thereof with an improved adjustable lumbar supporter which can eliminate the above-mentioned drawback.

Another object of the present invention is to provide a seat with an ajustable lumbar supporter which is actuated by an electric motor for facilitating the operation of the supporter.

Still another object of the present invention is to provide a seat with an adjustable lumbar supporter which can vary the height at which lumbar support is provided in response to the ON-OFF operation of an electric switch.

A further object of the present invention is to provide an adjustable lumbar supporter which can also act as a massager for the lumbar area of the occupant seated on the subject seat.

SUMMARY OF THE DRAWINGS

Other objects and advantages of the present invention will become apparent from the following description when taken in conjunction with the accompanying drawings, in which.

DESCRIPTION OF THE PREFERRED EMBODIMENTS

Figure 1:
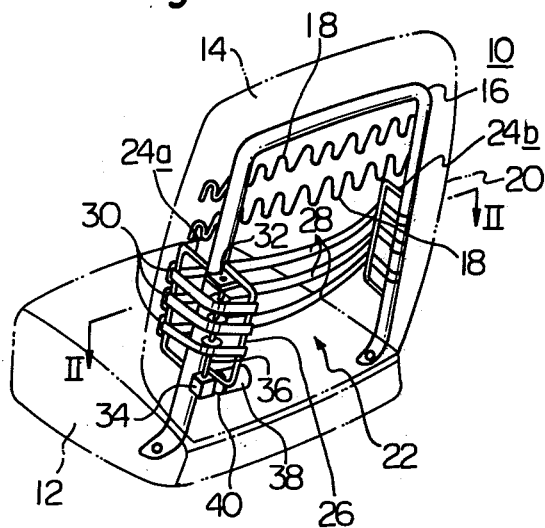
FIG. 1 is a perspective view of a first preferred embodiment of a seat according to the present invention.
Figure 3:
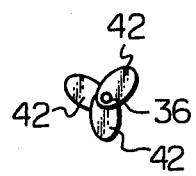
FIG. 3 is a plan view of the cam of FIGS. 1 and 2.
Figure 2:
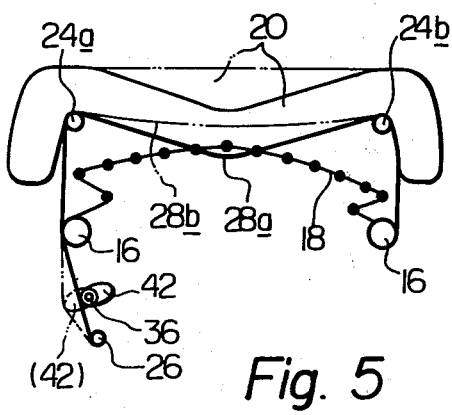
FIG. 2 is a sectional view taken on the line II—II of FIG. 1, showing the mutual relation between belts and cams used.

Referring to FIGS. 1 to 3, especially FIG. 1, there is illustrated a seat of the invention, generally designated by numeral 10. The seat generally comprises a seat portion 12 mounted via a suitable supporting means on the floor (not shown) of the vehicle, and a backrest portion 14 mounted to a rear portion of the seat portion 12. The backrest portion 14 hereinshown includes a U-shaped frame 16 having two foot portions respectively connected to rear portions of side frames (not shown) of the seat portion 12. A plurality of alternately curved spring wires 18 are spanned between leg or upright portions of the frame 16 in a conventional manner. These elements, such as the frame 16 and the spring wires 18, are coverd by known padding means 20. Within the backrest 14, an adjustable lumber supporter constituting an important part of the present invention is disposed, and is generally designated by numeral 22.

The adjustable lumbar supporter 22 comprises two bridge members 24a and 24b which are respectively mounted on the leg portions of the tubular frame 16 to project forwardly that is toward the front of the vehicle. A U-shaped arm 26 is fixed to the frame 16 just behind the bridge member 24a in a manner to project rearwardly, as shown. A plurality of belts 28 (three in the embodiment) are slackly strung across the bridge members 24a and 24b and fasten at their ends to the U-shaped arm 26 and the right leg portion of the frame 16, respectively. Designated by numerals 30 are belt guides fixed to the bridge member 24a. A bracket 32 and a gear box 34 are connected to the left leg portion of the frame 16 in a manner to be spaced from each other. A cam shaft 36 extends from the gear box 34 to the bracket 32 so as to cross the plurality of the belts 28. An electric motor 38 is operatively connected through its driving shaft 40 to the gear box 34 so as to rotate the cam shaft 36 about its axis when electrically energized. A plurality of cams 42 (three in this embodiment) are fixedly mounted on the cam shaft 36 in such a manner that they are spaced from each other and each is contactable with a corresponding one of the belts 28. As is shown in FIG. 3, the cams 42 are so arranged as to direct their lobes in different radial directions. It will be appreciated that when the lobe of each cam 42 is brought into contact with the corresponding belt 28 upon rotation of the cam shaft 36, the belt 28 becomes taut. Thus, the continuous rotation of the cam shaft 36 successively applies tension to the belts 28 thereby to cause same to become taut one after another permitting upward and downward movements of the level at which lumbar support is provided by the padding means. Although not shown in the drawings, a control switch connected to the electric motor 38 is set in an advantageous position where an occupant seated on the subject seat can easily operate same.

In operation, when the motor 38 is electrically energized to run in response to the actuation of the control switch, the cam shaft 36 is driven to rotate with the cams 42 resulting in that the belts 28 successively become taut to change the height of the lumbar support. When the lumbar support is at a desired height, the switch is switched off. With this, the desired position and degree of the lumbar support is obtained. In FIG. 2, the two extreme states of each belts 28 are shown, in which the belt in a taut state is indicated by 28b and the belt in the slack state by 28a.

Figure 4:
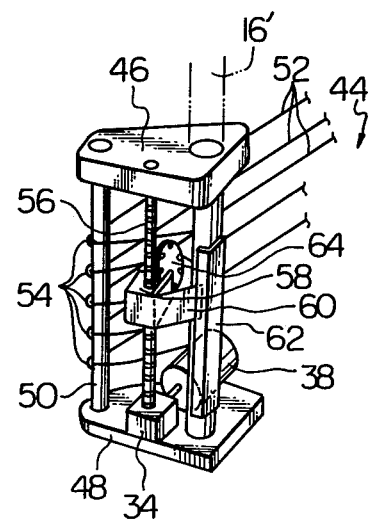
FIG. 4 is a perspective view of a main part of a second embodiment of a seat of the invention.
Figure 5:
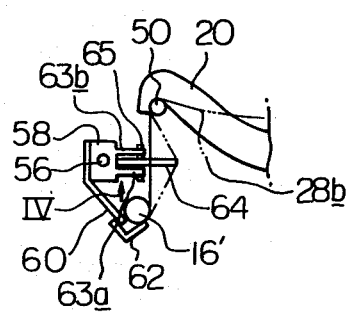
FIG. 5 is a sectional view taken on the line V—V of FIG. 4.
Figure 6:
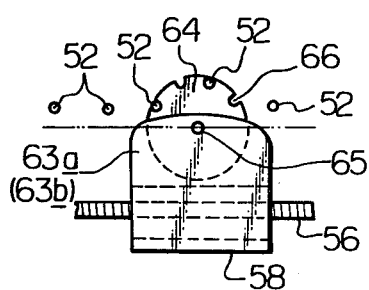
FIG. 6 is a view taken in the direction of the arrow VI of FIG. 5.

Referring to FIGS. 4 to 6, especially FIG. 4, there is illustrated an adjustable lumbar supporter 44 which constitutes an important part of a second embodiment of a seat according to the invention. In these drawings, the part designated by numeral 16' corresponds to the left leg portion of the U-shaped frame 16 mentioned before. Numerals 34 and 38 indicate the gear box and the electric motor having the same constitution as those mentioned before.

The adjustable lumbar supporter 44 according to this second embodiment comprises first and second vertically spaced brackets 46 and 48 which are mounted on the frame 16' to project forwardly. A rod 50 is spanned between the forwardly projected portions of the brackets 46 and 48. Although not shown in the drawings, a bridge member having substantially the same construction as the before-mentioned bridge member 24b is connected to the right-leg portion of the frame 16' to project forwardly. A plurality of flexible wires (five in this embodiment) are sluckly strung over and between the rod 50 and the bridge member and fasten at their ends to the right and left leg portions of the frame 16', respectively. Designated by numerals 54 are wire guides fixed to the rod 50. A unit of the gear box 34 and the electric motor 38 is mounted on the second bracket 48. A shaft 56 having a continuous helical rib, or thread thereon extends from the gear box 34 to the first bracket 46 to cross the wires 52, and is arranged so that the shaft 56 rotates about its axis when the motor 38 runs. Threadedly received on the shaft 56 is a guide box 58 having a plate 60 divergently extending therefrom. The leading end of the plate 60 is slidably received in an elongate groove(not numeral) defined between the left leg portion of the frame 16' and the bend edge(not numeral) of a guide plate 62 attached to the left leg portion, as shown. Thus, the guide box 58 travels along the shaft 56, without rotating about the axis of the same, upwardly and downwardly in response to the axial rotation in one and reverse directions of the shaft 56. As is best seen in FIG. 5, the guide box 58 takes the form of a clevis with spaced arm portions 63a and 63b mounting therebetween a vertical pulley 64. The pulley 64 is rotatably supported via a pin in a manner that the periphery of the pulley 64 is urgingly in contact with the wires 52. The pulley 64 is formed in the periphery thereof with notches 66 at spaced intervals, preferably at evenly spaced intervals. Each of the notches 66 is sized to receive the wires 62. As is shown in FIG. 6, the arm portions 63a and 63b are formed with rounded shoulders which extend past the perimeter of the pulley 64 to facilitate ingress and egress of the wires 52 into and from the notches 66 upon rolling of the pulley 64 from one wire to another. With this, it will be appreciated that the movement of the guide box 58 along the shaft 56 induces successive application of the tension to the wires 52 changing the height of the lumbar support exerted by the padding means.

In operation, when the motor 38 is energized to run in response to the actuation of the control switch, the shaft 56 rotates to move the guide box 58 upwardly or downwardly causing the pulley 64 to tension the wires 52 one after another. Thus, the wires 52 become taut one after another changing the contour of the padding means which provides lumbar support. When the contour assumes a desired curvature, the switch is switched off. With this, the desired position of the lumbar support is maintained. Although in this second embodiment a plurality of wires 52 are employed, a net spread over the frame 16' may be used in lieu thereof.

Now, it should be noted that the adjustable lumbar supporters 22 and 44 mentioned above can act as a massager for the back of the seated occupant when the motor 38 continues to run in case of the supporter 22 and the motor 38 is actuated to periodically change the rotational direction thereof in case of the supporter 44.

It should be noted that the foregoing description shows only two embodiments. Various modifications such as one using a manually operating handle or winder as a substitute for the electric motor 38, will be apparent to those skilled in the art without departing from the scope of the present invention which is only limited by the appended claims.

What is claimed is:

1. A seat backrest having a main frame on which a contourable portion constituted by padding means is supported, and a lumbar supporter mounted to said main frame for imparting a curvature to said contourable portion to produce a desired contour, said lumbar supporter comprising:
   a plurality of spaced substantially parallel elongate flexible members slackly strung across the front of said main frame;
   supporting means fixedly provided to said main frame and over which said elongate flexible members are passed to provide a spaced relationship between said main frame and said elongate flexible members; and
   tension applying means for applying tension to each of said elongate flexible members to cause same to become taut one after another.

2. A seat backrest as claimed in claim 1, in which said tension applying means comprises:
   a cam shaft;
   a plurality of cams fixedly mounted on said cam shaft in a manner to be spaced from each other and have lobes thereof projected in different radial directions;
   said cam shaft being such arranged that said lobes are successively brought into contact with said elongate flexible members respectively upon rotation of said shaft about its axis.

3. A seat backrest as claimed in claim 1, in which said tension applying means comprises:
   a shaft having a thread formed thereon;
   a base member threadedly mounted on said shaft so as to be movable along said shaft in response to rotation of said shaft about its axis; and
   a pulley rotatably supported by said base member;
   the assemblage of the above elements being such that the periphery of said pulley successively engages said elongate flexible members upon movement of said support member along said shaft.

4. A seat backrest as claimed in claim 3, in which the periphery of said pulley is formed with equidistantly spaced notches, each notch being sized to receive one of said elongate flexible members.

5. A seat backrest as claimed in claim 4, further comprising means for preventing said base member from rotation about said shaft.

6. A seat backrest as claimed in claim 2, further comprising an electrical driving means for rotating said cam shaft about its axis when electrically energized.

7. A seat backrest as claimed in claim 5, further comprising an electric driving means for rotating said shaft about its axis when electrically energized.

* * * * *